United States Patent Office
3,330,549
Patented July 11, 1967

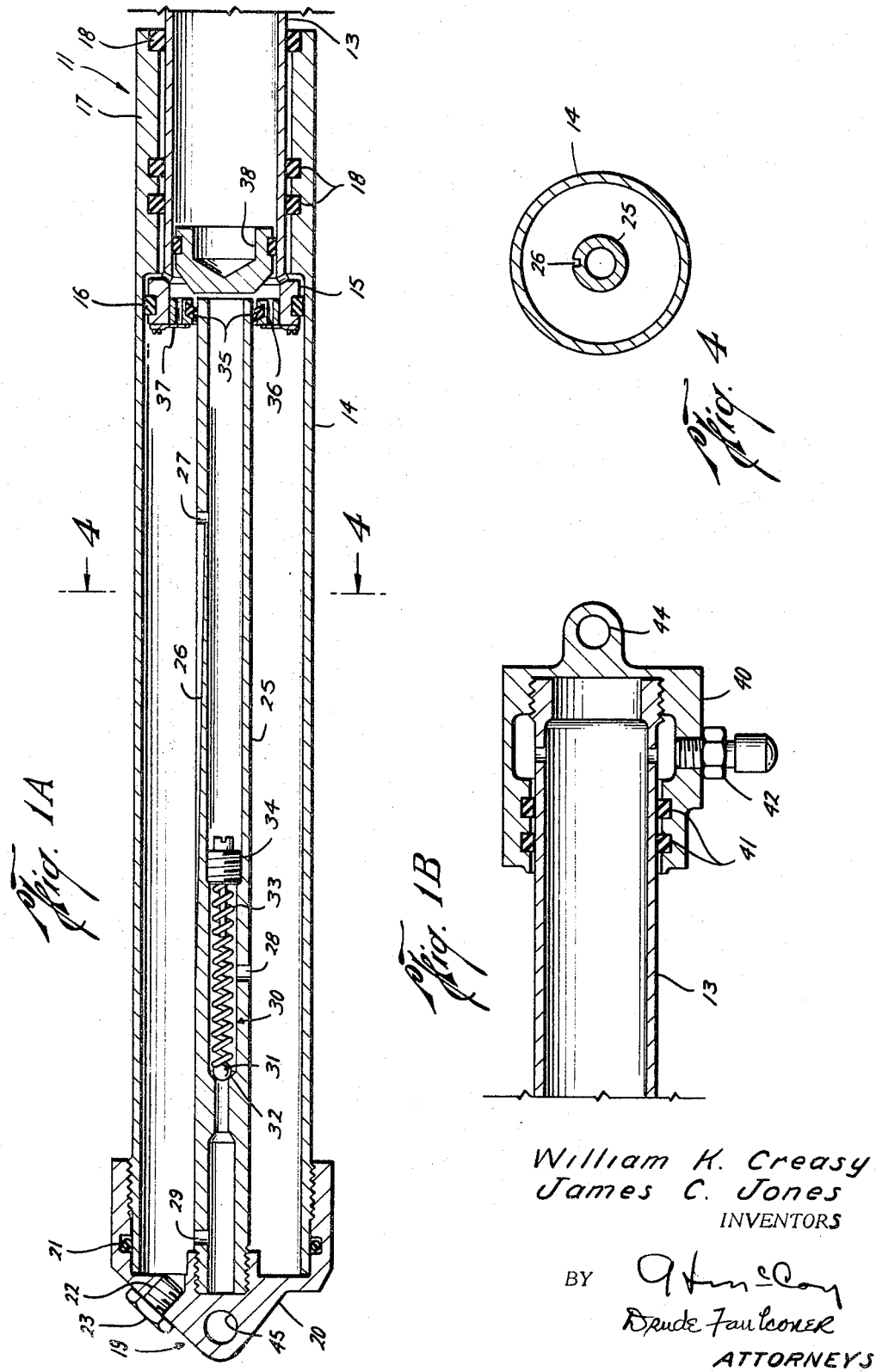

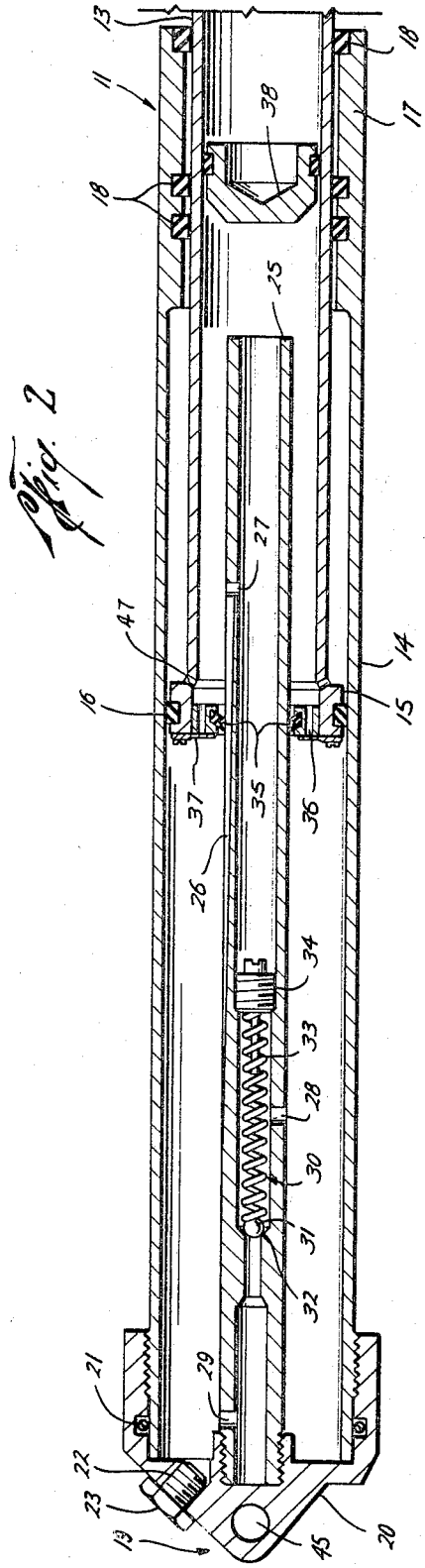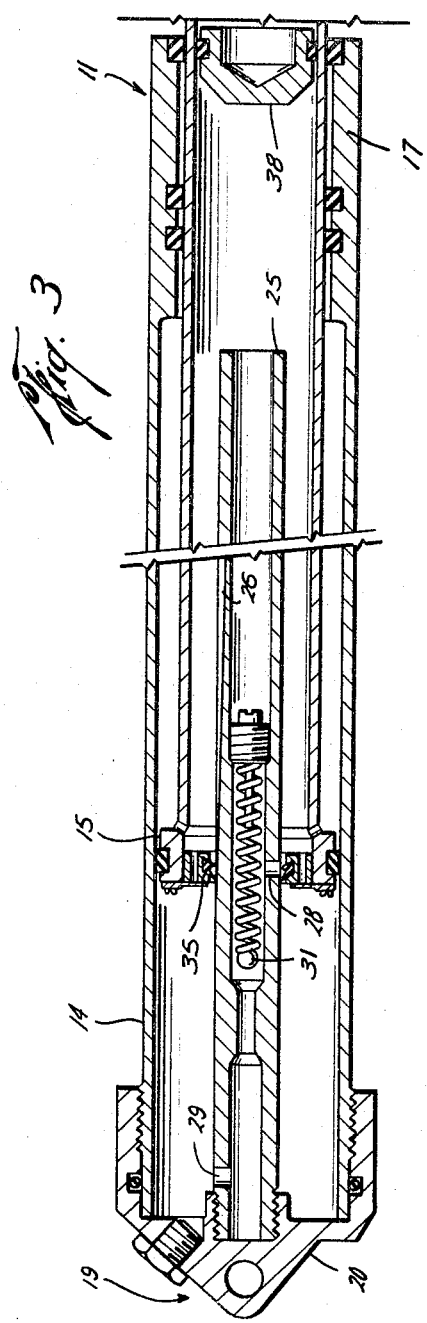
William K. Creasy
James C. Jones
INVENTORS

3,330,549
SHOCK ABSORBER
William K. Creasy, Dickinson, and James C. Jones, Houston, Tex., assignors to the United States of America as represented by the National Aeronautics and Space Administration
Filed Sept. 16, 1965, Ser. No. 487,934
10 Claims. (Cl. 267—64)

The invention herein described may be manufactured and used by the Government of the United States of America for governmental purposes without the payment of any royalties thereon or therefor.

This invention relates to shock absorbers and more particularly relates to a double-acting shock absorber that can function highly efficiently over a large range of impact loads applied thereto.

Docking mechanisms of the type used in mating two vehicles together while both are in flight must include some means to dissipate kinetic energy when the vehicles contact each other. The amount of energy to be dissipated will depend upon both the mass of each vehicle and the relative closing speed between them at the time of impact. Since some spaceflight mission plans call for multiple docking operations during the same flight, the energy attenuating or shock absorbing means for the docking mechanism used in such flights must be capable of handling impacts over a wide range of energy values. For example, the mission plan for the space hardware presently considered for the first manned lunar flight requires that two separate and distinct docking operations be carried out while flight is in progress. The first docking operation takes place just after translunar injection, with the second operation being performed in lunar orbit. The masses of the two docking vehicles are considerably less (due to spent fuel, jettisoned rocket stages, etc.) during the lunar orbital dock than they are during the translunar dock, so that the maximum energy dissipated by the docking mechanism during the translunar dock will be approximately ten times greater than the maximum energy dissipated during the lunar orbital dock.

Due to the very nature of spaceflight it is not practical to provide different shock absorbers for the different docking operations since there is no effective way to manually change them during flight. Furthermore, presently available shock absorbing means which are primarily designed for handling the higher energy impacts of the translunar dock are inadequate for the lower energy impacts of the lunar orbital dock since such means will not sufficiently react under the lighter loads to dampen the impact between the vehicles. Likewise, prior art shock absorbers which will adequately respond under the relatively light lunar orbital impacts will not dissipate the energy of the much heavier translunar impacts unless their strokes are prohibitively long. Since the length of the shock absorber is limited in space docking operations, as well as in almost every other shock absorbing environment, the maximum energy from the most extreme impact anticipated to be encountered by the shock absorber must be dissipated within a relatively short, defined stroke. Also, since the closing speed between vehicles may vary during a particular docking operation, e.g. from 0.1 f.p.s. to 1.0 f.p.s., the shock absorber must have a defined stroke for each mass value which is substantially independent of this variance in closing speed. This is necessary in order to definitely determine the minimum and maximum length of stroke required to dissipate the energy during each docking operation regardless of the exact velocity of the impacting body.

The present invention provides a shock absorbing means which will function equally as well during the lunar orbital dock as it does during the translunar dock, and more generally will function in any environment where a large range of energy impacts are encountered. Also, the stroke of the shock absorbing means remains substantially constant during an impact of a body having a particular mass, even when the impacting velocity of the body varies somewhat.

The present shock absorber comprises a hollow rod telescoped within a fluid-filled cylinder, said rod having a piston thereon in sealing engagement with the interior of the cylinder. A metering tube assembly is attached to the lower end of the cylinder and extends upwardly through the cylinder into the rod. Contained on or within the tube assembly are three distinct metering means for controlling the bypassing of fluid around the piston whenever an impact forces the rod into the cylinder. These metering means, either separately or in combination, will control flow under different situations, depending primarily upon the mass of the impacting body.

The first means consists of a simple orifice through the tube near its rod end which provides a bypass for all the fluid displaced by the piston during impacts wherein the impacting body is of a relatively low mass. This orifice is sized to offer resistance to fluid flow, and the pressure developed within the cylinder end, due to this resistance, will adequately dissipate the energy of relatively light mass impacts and bring movement of the rod to a stop before the piston reaches the orifice.

Adjacent to the orifice and extending along a portion of the tube, is a tapered groove. This second means is for metering fluid flow around the piston whenever the force of an impact is too great to be dissipated by the orifice, i.e., large mass impacts. This type metering means is common in hydraulic shock absorbers, and its function is well understood in the art. It is necessary to supplement the orifice with a metering groove for these heavier impacts instead of merely resizing or relocating the orifice because the damping coefficient for a simple orifice is constant, while the damping coefficient for a metering groove increases as the area of the groove decreases. For an orifice alone to adequately dissipate the energy of the heavier impacts, the stroke of the shock absorber would have to be of such length as to make its use impractical. Also, it is not feasible to eliminate the orifice and merely extend the metering groove to replace same, since in order to get the necessary response for the low mass impacts the area of the groove would have to be so large at its one end that a much thicker and heavier tube assembly would be required, thereby greatly increasing the overall size of the shock absorber.

Although the combination of the orifice and the metering groove will dissipate the greater part of the energy of the high mass impacts, the groove is too short and its taper too great at its small end for it to bring the stroke of the shock absorber to a relatively gradual stop. If the groove having the same taper is terminated as it normally is in prior art shock absorbers, the stroke of the shock absorber for the high mass impacts will be brought to a comparatively abrupt stop when the piston reaches the end of the groove, and this is totally unacceptable in space docking operations. To alleviate this problem, the present invention provides a third metering means in the form of a preset pressure regulator positioned within the tube and having its inlet through the tube at a point below termination of the groove. This regulator is set to open during extremely heavy impacts at the instant the piston reaches the end of the groove so that the stroke of the piston can extend past the end of the groove. Due to the pressure regulator, the fluid ahead of the piston will apply a constant force against the piston to bring the stroke to a quick but relatively gradual stop. This allows the metering groove to be of a relatively short length and to be machined in accordance with present practices, and at the same time prevents the stroke of the shock absorber from being brought to an abrupt stop during high mass impacts. A more detailed description of the function of the pressure regulator will be set forth below.

The actual construction, operation, and the apparent advantages of the invention will be better understood by referring to the drawings in which like numerals identify like parts in the different figures and in which:

FIG. 1A is a longitudinal sectional view of a portion of the shock absorber in accordance with the invention, with the shock absorber being in its initial or extended position;

FIG. 1B is a longitudinal sectional view of the continuation of the rod member of the shock absorber in FIG. 1A and is also common to FIGS. 2 and 3;

FIG. 2 is a longitudinal sectional view of the apparatus of FIG. 1A when it is in a partially compressed position;

FIG. 3 is a longitudinal sectional view of the apparatus of FIG. 1A when the stroke reaches the termination of the metering groove; and FIG. 4 is a sectional view of the apparatus taken along line 4—4 of FIG. 1A.

Referring more specifically to the drawings, shock absorber 11 comprises a hollow rod 13 telescopically positioned within cylinder 14. The inner end of rod 13 is enlarged to form piston 15 which has seal means 16 mounted thereon to assure a slidable, sealing relationship with the interior surface of cylinder 14. Cylinder 14 has an enlarged wall portion 17 at its inner end which cooperates with piston 15 to limit relative movement between the rod and cylinder when they are in their extended position. Seal means 18 are mounted on cylinder 14 to maintain a fluid tight seal between the rod and cylinder.

Metering tube assembly 19 is carried by the outer end of cylinder 14 and is secured thereto by means of threaded cap 20. An O-ring type fluid seal 21 is positioned between the cap and the cylinder. Opening 22 is provided in cap 20 for filling the cylinder with hydraulic fluid, and is threaded to receive removable plug 23. Hollow metering tube 25 is connected to the inner side of cap 20 and extends into the cylinder when the cap is in place. Tube 25 has a metering groove 26 along a portion of one side thereof, the cross-sectional area of which tapers reducingly from the rod end of tube 25 towards the cap end thereof and terminates at a point substantially above the cap end, as clearly seen in the figures. There are three openings through tube 25 which fluidly connect the exterior of tube 25 and the inner bore thereof. The first opening, orifice 27, is located at a point immediately adjacent the large end of groove 26; the second opening, port 28, is located at the termination point of groove 26 but on a different side of tube 25; the third opening, inlet 29, is spaced from port 28 near the cap end of tube 25. The purpose of these openings will become obvious from the discussion of operation set forth below.

Positioned within the bore of the tube 25 is pressure regulator 30 having a ball valve 31 which mates with seat 32 on tube 25. Ball 31 is biased into engagement with seat 32 by means of spring 33, the tension of which can be adjusted by screw 34. Seat 32 is located within tube 25 at a point lying between port 28 and inlet 29.

The tube 25 extends along cylinder 14 and into the lower end of rod 13, even when shock absorber 11 is in its extended position (see FIG. 1A). Seal means 35 mounted on the inner bore of piston 15 provides a sliding seal between the inner surface of rod 13 and tube 25. Piston 15 has longitudinal openings 36 therethrough which are normally closed by flapper-type valves 37, the purpose of which will be set out below. A free floating piston 38 is positioned within the bore of rod 13. The outer end of rod 13 is closed by threaded top 40 which has seals 41 thereon and a gas admitting valve 42 therethrough.

After the shock absorber 11 has been assembled, a desired volume of gas such as air (not shown) is injected into rod 13 through valve 42. As will be more fully explained below, this gas will act as a biasing means against free piston 38 to return the shock absorber to its extended position after the impacting force is dissipated. It should be realized that a spring or other biasing means could be used in place of the gas without departing from the present invention. Cylinder 14 is next filled with a noncompressible liquid (e.g., ordinary hydraulic fluid) through opening 22 in cap 20, and is sealed by plug 23. Connection means 44 and 45 are provided on top 40 and cap 20, respectively, for securing shock absorber 11 into its desired environment. After it is in place, the operation of the present invention is as follows.

With shock absorber 11 in the position shown in FIG. 1A, an impact or force applied to rod 13 will cause same to move inward into cylinder 14, pushing fluid ahead of piston 15 through orifice 27. The displaced fluid will flow into the inner bore of rod 13 and force free piston 38 back against the charge of gas. Ports 47 (FIG. 2) are formed in rod 13 to allow some of the displaced fluid to fill the space between rod 13 and cylinder 14 to provide better stability in the stroke of rod 13. Orifice 27 is sized to offer resistance to the flow of fluid therethrough and the force generated by this resistance, acting upon piston 15, will dissipate the energy of low mass impacts and stop the movement of rod 13 before piston 15 reaches orifice 27. When the force applied to rod 13 decreases to a value less than the force generated by the compressed gas in rod 13, the gas will act on free piston 38 to push the fluid in rod 13 back through flapper valves 37 to return shock absorber 11 to its extended position.

Since the length of the stroke of the present shock absorber depends primarily upon the mass of the impacting body (as will be more fully explained below), an impact by a heavier body will drive piston 15 past orifice 27 and along metering groove 26 (see FIG. 2). When this occurs, fluid can bypass piston 15 only through groove 26, and since the groove is tapered, the area for bypassing fluid will continuously decrease as piston 15 moves along the groove. This reduction in area continuously increases the damping coefficient of groove 26 which allows large amounts of energy to be dissipated in a relatively short stroke. The combination of orifice 27 and groove 26 will effectively dissipate the greater part of the energy of the high mass impacts. However, due to its limited length, groove 26 must be sharply tapered in order to dissipate the desired amount of energy in such a relatively short stroke. This sharp taper does not allow groove 26 to be drawn out to a gradual termination point which is ordinarily necessary to bring the stroke to a relatively gentle stop. If sharply tapered groove 26 is terminated as it is in the present invention, and as it normally is in prior art shock absorbers, in the absence of some additional metering means rod 13 during high mass impacts, will be brought to a sudden abrupt stop, which is both undesirable and unacceptable in space docking operations.

In order to make shock absorber 11 short and compact, and at the same time dissipate the energy of relatively high mass impacts without bringing the stroke to an abrupt stop, preset pressure regulator 30 is positioned within the tube assembly 19. As seen in FIG. 3, when sealing means 35 reaches the termination point of groove 26, at least a portion of port 28 will be open to the interior of rod 13. This allows fluid ahead of piston 15 to enter inlet 29, act on and open regulator 30, and flow out port 28. When regulator 30 opens it provides a constant pressure independent of the piston velocity which acts against piston 15 to quickly but relatively gently bring the movement of rod 13 to a stop. The pressure regulator is set to open at a pressure less than that pressure which would normally stop the stroke abruptly at the end of groove 26. By means of adjusting screw 34, the pressure at which regulator 30 is to open can be accurately set. As set forth above, this allows a relatively short metering groove to be used to dissipate large amounts of energy without having an undesired abrupt halting of the stroke at the end of the groove.

Also, since both the simple orifice and a metering groove have damping characteristics which follow the equation $$F = CV^2$$

where F is the damping coefficient of the orifice or groove and V is the velocity of the load, the length of the stroke required to dissipate the energy of a particular mass load will remain substantially constant, even where the velocity of the impact body varies. This is due to the fact that while an increase in impact velocity will increase the force of the impact, the dissipating force developed by the shock absorber in a particular stroke (which is also dependent upon velocity) will accordingly increase. This allows the length of stroke necessary to dissipate the energy of a particular mass value to be accurately predetermined and the shock absorber designed accordingly.

By utilizing a combination of the three above mentioned metering means in the defined relationship set forth, a short, compact shock absorber is provided which is capable of responding to low load impacts and which at the same time is capable of dissipating energy over a wide range of values without any manual adjustment being made thereto. Although this shock absorber has been described in relationship with space docking operations, it should be realized that it could be used in any environment where the mass of a determinable impacting body will substantially vary from time to time.

What is claimed and desired to be secured by Letters Patent is:

1. A shock absorber comprising a hollow cylinder having a closed end and an open end, and adapted to be filled with fluid;
   a hollow rod having a closed end and an open end;
   a hollow piston attached to said open end of said rod, said rod and said piston telescopically positioned within said cylinder with said piston being in sealing, slidable relationship with the interior wall of said cylinder;
   a hollow tube disposed within said cylinder and attached at one end to the inside of said closed end of said cylinder and extending through said piston and into said rod;
   means on the interior of said hollow piston for slidably sealing said rod and said piston;
   said tube having an orifice through the wall thereof located near the other end of said tube and between the closed end of said cylinder and said hollow piston when said cylinder and said rod are in an extended position in relation to each other, whereby said orifice meters flow of fluid around said hollow piston to dissipate energy when said rod and piston are pushed into said cylinder by a force;
   said tube having a metering groove having its large end commencing immediately adjacent said orifice and extending along a portion of said tube towards the closed end of said cylinder and terminating at a point above the closed end of said cylinder whereby said groove meters flow of fluid around said hollow piston to dissipate energy when said piston passes said orifice; and
   means within said tube for metering flow of fluid around said hollow piston when said piston passes the termination point of said groove to bring movement of said rod to a stop.

2. A shock absorber as defined in claim 1 wherein said means within said tube comprises:
   a preset pressure regulator positioned with said tube for allowing fluid flow only in the direction from the closed end of said cylinder toward the other end, said tube having an inlet and an outlet for said regulator through the wall thereof, said inlet being positioned at a point between said termination point of said groove and said closed end of said cylinder, and said outlet being positioned at a point adjacent said termination point of said groove and toward said closed end of said cylinder, whereby said piston will be past at least a portion of said outlet when it reaches the termination point of said groove.

3. A shock absorber as defined in claim 2, including:
   means within said rod for returing said rod and piston to its extended position when the force acting on the shock absorber is released.

4. A shock absorber as defined in claim 3 wherein said pressure regulator includes means for adjustably selecting the pressure at which said regulator will open.

5. A shock absorber capable of attenuating energy over a wide range of impact loads comprising:
   a cylinder closed at one end and adapted to be filled with fluid;
   a hollow rod having a piston means on one end thereof, said piston means telescopically received in said cylinder and forming a slidable seal with the interior wall of said cylinder;
   a fluid flow metering assembly means disposed within said cylinder and attached to said closed end thereof, and extending through said piston means, said metering assembly means including:
      a first fluid flow metering means positioned between said piston means and said closed end of said cylinder when said rod and cylinder are in their extended position for initially bypassing fluid around said piston to dissipate energy when said rod and piston means are moved toward the closed end of said cylinder by a force;
      a second fluid flow metering means positioned adjacent said first metering means at a point between said first metering means and said closed end of said cylinder for bypassing fluid around said piston to dissipate energy when said piston means has been moved past said first metering means; and
      a third fluid flow metering means positioned between said second metering means and said closed end of said cylinder for developing a constant force against said piston means to bring the movement of said rod to a relatively gradual stop after said piston means has been moved past said second metering means.

6. A shock absorber as defined in claim 5 including:
   means within said rod for returning said rod and piston to its extended position when the force acting on the shock absorber is released.

7. A shock absorber capable of attenuating energy over a wide range of impact loads comprising:
   a cylinder closed at one end and adapted to be filled with fluid;
   a hollow rod having a piston means on one end thereof, said piston means telescopically received in said cylinder and forming a slidable seal with the interior wall of said cylinder;
   a hollow metering tube assembly disposed within said cylinder and attached to said closed end thereof and extending through said piston means;
   a first fluid flow metering means on said tube assembly positioned between said piston means and said closed end of said cylinder when said rod and cylinder are in their extended position, for bypassing fluid around said piston means to dissipate energy when said rod and piston means are moved toward the closed end of said cylinder by a force; and a second fluid flow metering means on said tube assembly positioned between said first metering means and said closed end of said cylinder for developing a constant force against said piston means to bring the movement of said rod to a relatively gradual stop after said piston means has moved past said first metering means.

8. A shock absorber as defined in claim 7 wherein said second fluid flow metering means comprises:

a preset pressure regulator positioned with said tube for allowing fluid flow only in the direction from the closed end of said cylinder toward the other end, said tube having an inlet and an outlet for said regulator through the wall thereof, said inlet being positioned at a point between said first metering means and said closed end of said cylinder, and said outlet being positioned at a point adjacent said first metering means and toward said closed end of said cylinder whereby said piston will be past at least a portion of said outlet when it is past said first metering means.

9. A shock absorber as defined in claim 8 including: means within said rod for returning said rod and piston to its extended position when the force acting on the shock absorber is released.

10. A shock absorber capable of attenuating energy over a wide range of impact loads comprising:

a cylinder closed at one end and adapted to be filled with fluid;

a hollow rod having a piston means on one end thereof, said piston means telescopically received in said cylinder and forming a slidable seal with the interior wall of said cylinder;

a fluid flow metering assembly means disposed within said cylinder and attached to said closed end thereof and extending through said piston means, said metering assembly means including:

a first flow metering means positioned between said piston means and said closed end of said cylinder when said rod and cylinder are in their extended position for bypassing fluid around said piston means to dissipate energy when said rod and piston means are moved toward the closed end of said cylinder by a force; and a second fluid flow metering means positioned between said first metering means and said closed end of said cylinder for developing a constant force against said piston means to bring the movement of said rod to a relatively gradual stop after said piston means has been moved past said first metering means.

References Cited
UNITED STATES PATENTS
3,067,841  12/1962  Kendall _____ 267—64

FOREIGN PATENTS
993,812  6/1965  Great Britain.

ARTHUR L. LA POINT, *Primary Examiner.*

R. M. WOHLFARTH, *Assistant Examiner.*